May 30, 1939.  J. R. BARNHART  2,160,712
METERING CIRCUIT
Filed May 3, 1937  2 Sheets-Sheet 1
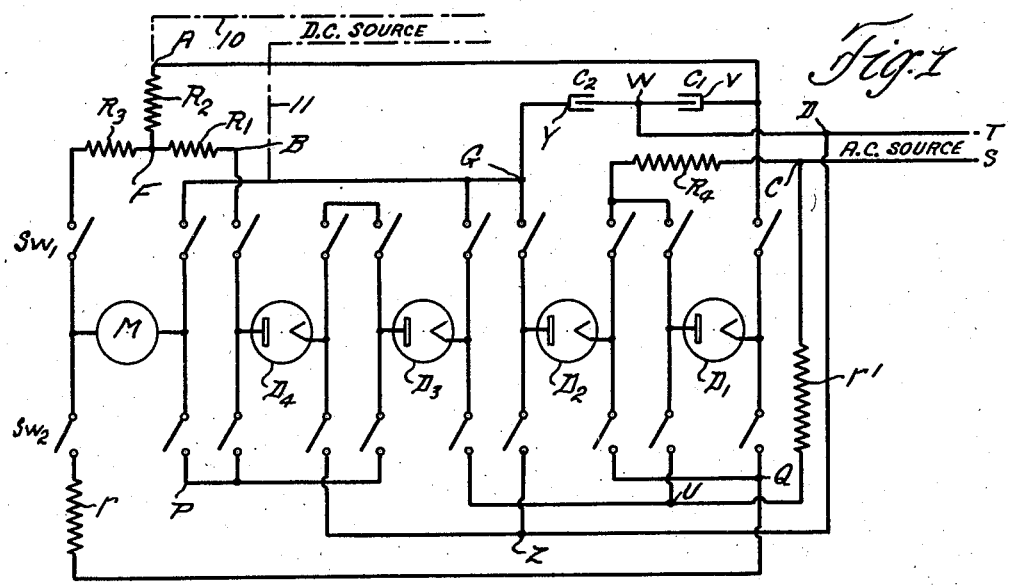
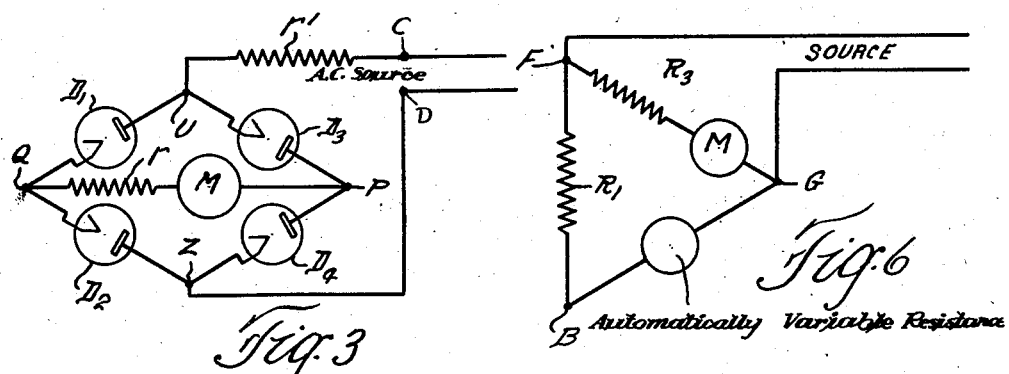
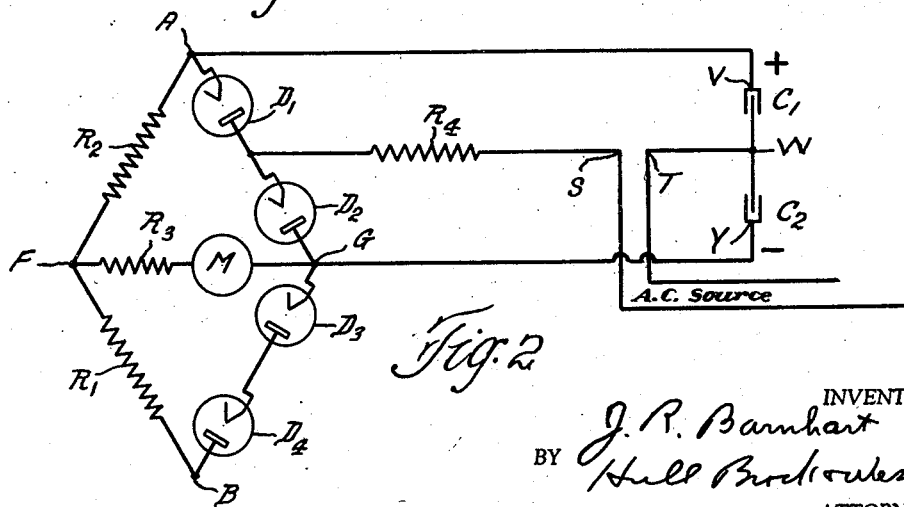
INVENTOR.
J. R. Barnhart
BY Hull Brock West
ATTORNEY.

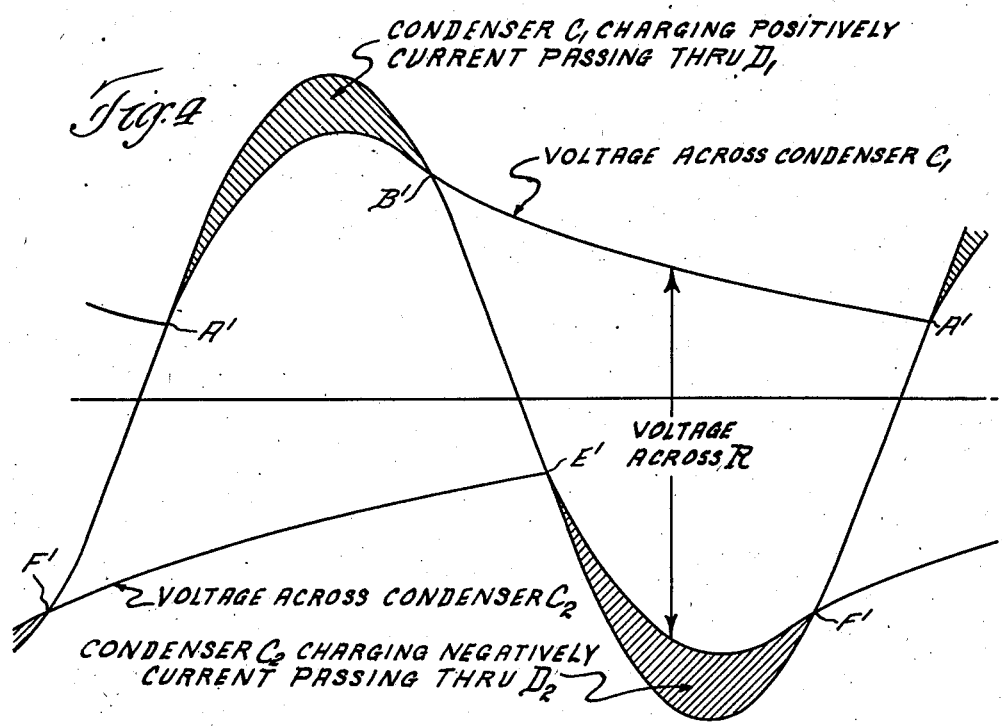
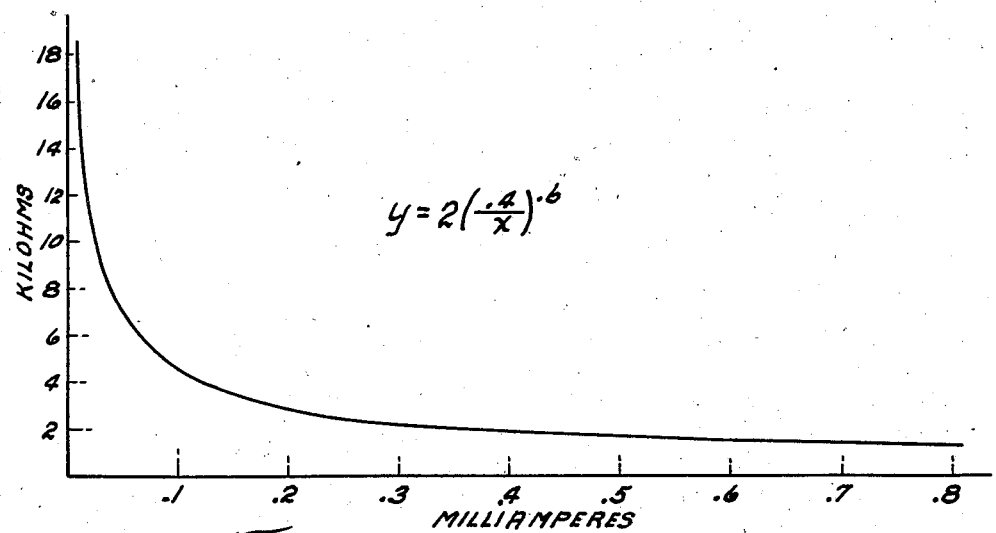

Patented May 30, 1939

2,160,712

UNITED STATES PATENT OFFICE 2,160,712

METERING CIRCUIT

Job R. Barnhart, Lakewood, Ohio

Application May 3, 1937, Serial No. 140,475

9 Claims. (Cl. 171—95)

This invention relates to a metering device and particularly to a circuit for metering alternating currents and producing pointer deflections of approximately the same magnitude responsive to unit current or voltage changes at all parts of the scale, whereby scale divisions may be equal throughout. An object is the production of such a circuit involving the rectification of the alternating current before it is metered and approximate compensation for the principal factors which tend to produce non-linearity in the current-deflection curve. A further object is the production of such an instrument which will be capable of use interchangeably as a meter for alternating and direct current, securing substantially equal accuracy with each and employing only one scale to be read in exactly the same way whether the current being measured is alternating or direct. A further object is the provision of an auxiliary circuit for use in cases of higher range metering where the resistance of the rectifying means is a negligible part of the total resistance in the circuit. The auxiliary circuit makes use of the same rectifying means with appropriate switching means for inserting them successively in the main and auxiliary circuits.

Other objects will be in part apparent and in part pointed out hereinafter in connection with the accompanying drawings wherein Fig. 1 is a diagram of a circuit embodying the invention; Fig. 2 is a diagram of the main circuit only and arranged to bring out more clearly the relation of the bridge portion of the circuit and the rectifying portion thereof; Fig. 3 is a similar diagram showing the auxiliary circuit alone; Fig. 4 is a graphic representation of the effect of the rectifying circuit on an applied alternating E. M. F.; Fig. 5 is a diagram showing the plate resistance-current curve for a typical diode; and Fig. 6 is a wiring diagram of a simpler circuit capable of realizing some of the features of the invention.

In Figs. 1, 2 and 3, the same reference characters are applied to corresponding instrumentalities and junction points of the circuit, positions and connecting conductors being rearranged. I prefer to use thermionic vacuum tubes as rectifiers. These are variously termed also thermionic valves, diodes, etc. Since the essential elements of the rectifiers used in the present device are an electron emitting cathode and a plate, I prefer to term them diodes. They may be separate tubes as indicated or a plurality of diodes may be enclosed in the same evacuated or gas filled envelope. By the use of the fundamental circuit of Fig. 2 I compensate for two principal factors tending to produce error in the scale reading, viz., diode potential and plate resistance.

If a meter be placed in the plate circuit of a diode and the cathode be energized, the meter will show an E. M. F., which I call diode potential. Compensation for this factor is fade by what I term the bridge portion of the circuit of Fig. 2, that is, the circuit A, $R_2$, F, $R_1$, B, $D_4$, $D_3$, G, $D_2$, $D_1$, with the meter M and $R_3$ joining the points F and G.

In this bridge $R_1$ is of such resistance that the drop of potential from F to B is equal to the rise in potential from B to G and $R_2$ is so selected that the drop from A to F equals the rise from G to A. It follows that no current will flow through the meter M as a result of diode potential, no matter what that potential may be, nor how it may vary, so long as it follows the same law in both tube arms of the bridge. Commercial tubes are sufficiently alike for approximately perfect compensation for diode potential. It should be understood that diode potential cannot be compensated by a mere shifting of the zero point on the meter scale since at low currents it is a considerable factor and as the current increases is reduced, finally to a negligible quantity.

Consider now the rectifying circuit, which is the remainder of the circuit of Fig. 2 as well as the arm AG of the bridge. A resistance $R_4$ is connected to the plate of diode $D_1$ and to the cathode of diode $D_2$. The other terminal of this resistance is connected to an alternating E. M. F. at S. The side T of said source of E. M. F. is connected through point W to condensers $C_1$ and $C_2$ which are preferably although not necessarily of equal capacity, the remaining terminals of which are connected respectively to A and G.

During the half cycle that the point S, of the source of E. M. F. is positive, electrons flow from the cathode to the plate of the diode $D_1$. Thus point A, and plate V, of the condenser $C_1$, become positively charged.

During the half cycle that the point T, of the source of E. M. F. is positive, electrons flow from the cathode to the plate of the diode $D_2$. Thus the point G and the plate Y, of the condenser $C_2$, become negatively charged. The condensers $C_1$ and $C_2$ are connected in series through the common point W. The condenser charge leaks off through A, $R_2$ and $R_3$ which is shunted by $R_1$, $D_4$ and $D_3$, to G and negative pole Y of the condenser $C_2$. The condensers are being continually charged and discharged as graphically shown in Fig. 4. The ballast resistance $R_4$ is used in calibration.

In Fig. 4 I have shown the effect of this condenser circuit on the characteristics of an alternating E. M. F. The shaded areas represent the portions of the cycle during which current passes through the diodes $D_1$ and $D_2$. From A' to B', the plate of $D_1$ is positive with respect to the cathode of $D_1$ and current flows into condenser $C_1$. From E' to F', the cathode of $D_2$ is negative with respect to the plate of $D_2$ and current flows out of condenser $C_2$. The total number of coulombs flowing through the diodes is of course equal to the total coulombs flowing through the resistance R. (R is the resultant resistance of $R_1$, $R_2$, $R_3$, M and the diodes in the branched circuit A to G.) But because the time of flow is shorter through the diodes, the current density is greater. The ratio of current density through the diodes to current density in R depends upon the value of R and also the values of $C_1$—$C_2$. If R is sufficiently great, the voltage across each condenser will build up to approximately the peak value of the applied E. M. F. and the voltage across R will be twice the peak value. Therefore the instrument can be designed as a peak voltmeter and without loss of its advantages. I prefer to select resistors and condensers of such value that the current density in the diodes is approximately twice the average value in R.

It will now be obvious why the arms AG and BG of the bridge A F B G include two diodes in series. Those $D_1$ and $D_2$ are necessary in the adopted rectifying circuit and those $D_3$ and $D_4$ are necessary to effect a balance in the bridge arms. The latter also compensate for non-linearity in the plate resistance-current curve as will be presently explained. A still further feature of the use of four diodes will be pointed out in connection with Fig. 3.

The plate resistance-plate current curve of commercial diodes is of a shape corresponding generally to the equation $$y=\left(\frac{1}{x}\right)^a$$

a representative sample tube giving experimentally a curve fitting the expression $$y=2\left(\frac{.4}{x}\right)^{.6}$$

This curve is plotted in Fig. 5 where plate current in milliamperes is plotted against plate resistance in kilohms. The curve for the commercial copper oxide rectifier is of similar shape (see L. B. W. Jolley, Alternating current rectification, third edition, page 452, published by John Wiley & Sons). I may use such types of rectifier but I greatly prefer to use thermionic tubes.

It will be clear from Fig. 5 that if full scale deflection is about one milliampere, there will be considerable non-linearity up to about 0.3 milliampere. However, the high plate resistance in the arm AG of the bridge in this low scale range is compensated by a similar high plate resistance in the arm GB, since $R_1$, $D_4$ and $D_3$ form a shunt around the meter M. By adjusting the values of $R_1$ and $R_2$ with respect to $R_3$ the necessary proportion of current can be shunted around the meter to secure compensation at a selected point on the curve of Fig. 5, or corresponding curve on other diodes or rectifiers.

In describing the compensation for diode potential, it was assumed that no potential was applied across the arm AG. When a potential is applied across this arm, it produces a deflection of the meter M, but diode potential remains compensated. The meter M measures a current determined by the drop of potential from F to G and may be calibrated in voltage or current units as desired.

In practice I make the combined resistance of $R_1$, $D_4$ and $D_3$ greater than that of $R_3$ so that the current flowing through diodes $D_4$ and $D_3$ will be less than that through the meter. A non-linearity in the plate resistance of $D_1$ and $D_2$ produced by reduction of current will tend to produce too small a change in meter deflection, but such non-linearity will be counteracted by a greater non-linearity in $D_4$ and $D_3$, since the non-linearity of the diodes is according to the curve of Fig. 5 greater at low currents, and there is more current through the arm AG than through the arm BG. Thus by shunting only a small part of the current through the compensating diodes I am able to compensate approximately completely for non-linearity of the plate resistance-current curve and for diode potential. The greater the plate resistance of the compensating diodes, whether of a single one or a plurality in series, the current-resistance curve remaining of the same or similar characteristics, the more pronounced the effect just described and the smaller the amount of current shunted around the meter needs to be.

The proper values of the resistors $R_1$, $R_2$ and $R_3$ may be determined by "cut-and-try" methods or they may be calculated in advance. A typical case is calculated for illustration as follows:

$R_3$ is assumed to be 2.35 kilohms including the meter M, which has a sensitivity of .9 milliampere for full scale deflection. $R_1$ and $R_2$ are in this particular case to be made equal when their values are determined. $R_1$, $D_4$ and $D_3$ constitute a compensating shunt around $R_3$ and M. It is found in this particular case, with a tentative value of $R_2$ and without the shunt $R_1$, $D_4$ and $D_3$, that when the meter M is adjusted to be correct at full scale, it reads 6% low at ¼ scale. ¼ scale deflection is chosen because in that region departure from linearity is great.

Since the meter has a sensitivity of .9 milliampere, at full scale, the voltage drop across $R_3$ is $2.35 \times .9 = 2.115$ volts. F is positive with respect to G by 2.115 volts and G is positive with respect to B by .35 volt, since the diode potential of the two representative diodes in series was found to be .35 volt. Consequently F is positive with respect to B by 2.465 volts. It is now tentatively decided to shunt .180 milliampere through $R_1$ at full scale reading as a step toward compensation.

$$\frac{2.465 \text{ volts}}{.180 \text{ mil.}} = 13.69 \text{ kilohms}$$

which is the sum of the resistances of $R_1$, $D_4$ and $D_3$. Substituting in the plate resistance curve given above and plotted in Fig. 5, $$2\left(\frac{.4}{.180}\right)^{.6} = 3.23 \text{ kilohms}$$

which is the sum of the resistances of $D_4$ and $D_3$. Therefore, $R_1$ is $13.69 - 3.23 = 10.46$ kilohms, tentatively.

It was found at the beginning that the meter M read 6% low at ¼ scale. The current through the meter at ¼ scale should be .225 milliampere. 6% of .225 mil. is .0135 mil. To completely compensate, .0135 mil. must be shunted from $R_1$ to $R_3$. At .225 mil. the voltage drop across $R_3$ is .529 volt. Add to this, the drop across $D_3$—$D_4$, .35 volt, and the drop from F to B is .879 volt. If the resistance of $R_1$, $D_4$, $D_3$ remained at 13.69 kilohms as it was at full scale, the current through $R_1$ at ¼ scale would be, $$\frac{.879}{13.69} = .0642 \text{ mil.}$$

But .0135 mil. must be subtracted from .0642 to make up the deficiency in $R_3$. Therefore the resistance of $R_1$, $D_4$, $D_3$ must be increased to allow only .0507 mil. to flow through $R_1$. The total resistance should be $$\frac{.879}{.0507} = 17.34 \text{ kilohms}$$

Substituting again in the plate resistance curve, $$2\left(\frac{.4}{.0507}\right)^{\frac{1}{16}} = 6.88 \text{ kilohms}$$

Add to this the tentative value of $R_1$ previously found 10.46+6.88=17.34 kilohms.

Therefore the compensation is complete. Half scale and other points will be approximately (almost exactly) compensated as previously stated. The final calibration will be made by adjusting the series resistance $R_4$. If a different value is assumed for $R_3$, then new values must be found for $R_1$ and $R_2$, or vice versa. It is thus evident that for any value of meter sensitivity, the values of $R_1$, $R_2$ and $R_3$ can be adjusted to effect curve correction.

In practice, for any given range of meter, values would be established for $R_1$ and $R_2$ and individual meters would be compensated by adjusting $R_3$. Computation would not be necessary.

While this compensation method was developed primarily to correct non-linearity in A. C. meter scales, it is seen in Fig. 2 that the current dealt with is entirely unidirectional and the circuit can be so filtered as to render it purely D. C.

Therefore, if a source of direct current contains a variable component of resistance, said component can be compensated to produce linearity in a meter scale.

At this point, it should be noted that the use of four diodes as shown is not essential in all cases. Where, for example, the arrangement of Fig. 1 is abandoned and only the circuit of Fig. 2 is employed, the arm BG of the bridge may contain only one diode. Also where the diodes $D_1$ and $D_2$ are replaced by rectifiers which develop no potential, the compensators in the arm BG should not develop any potential, and may take the form of any resistance which automatically varies in a manner similar to the rectifier employed. Compositions are known which have variable resistance-current characteristics and these may be substituted for the diodes $D_3$ and $D_4$ where their non-linearity is sufficiently close to that existing in the current source, regarding the rectifying portion of the circuit of Fig. 2 as a current source, wherein the non-linearity is in the internal portion of the circuit, that is, in $D_1$ and $D_2$. Such an automatically variable resistance is indicated between B and G in Fig. 6, which shows the fundamental compensating circuit, neglecting the source of non-linearity of the current-resistance curve.

It is within the contemplation of the invention, not only to correct for non-linearity but also to produce a non-linearity of the meter scale by applying the circuit of Fig. 6 for metering a pure linear current so that the divisions at the lower end of the meter scale may be larger than those at the upper end. Such an arrangement would give the effect of great sensitivity for small currents coupled with high capacity for large currents. To the same end, a non-linear current, producing smaller deflections at low currents than at high, may be, so to speak, overcompensated, whereby to produce larger divisions at the lower end of the scale than at the upper.

Referring now to the auxiliary circuit, shown separately in Fig. 3, it will be seen that I have provided a circuit suitable for higher range instruments where the diode resistance may be a negligible part of the total resistance and full wave rectification may be secured. When the point C of the source is positive, current will flow from C through $r_1$, point U, $D_1$, point Q, $r$, M, P, $D_4$, Z and to point D of the source, the current through the meter M being from left to right as seen in the drawings. When the point D of the source is positive, current will flow from D to Z, through $D_2$, Q, $r$, M, P, $D_3$, U, $r$, to point C of the source, the current flow through the meter M being again from left to right. Since the cathodes of $D_1$ and $D_2$ are positive with respect to the plates $D_3$ and $D_4$, current will flow due to diode potential through the meter even though the source CD is zero. This current is reduced to a negligible quantity by the resistor $r$. This arrangement is possible because the diodes are able to withstand inverse voltages of considerable magnitude. It would not be possible with the copper oxide rectifiers. The range of the instrument of Fig. 3 can be controlled by properly selecting the value of $r_1$.

In Fig. 1, I have shown a circuit embodying both the circuits of Figs. 2 and 3. I also show, in dotted lines, conductors 10 and 11 adapted to be connected across a D. C. source. Separate conductors T and S are adapted to be connected across an A. C. source. As will be obvious, that portion of the circuit above the switch bank $Sw_2$ corresponds to Fig. 2 and that part below the switch bank $Sw_1$ corresponds to Fig. 3. By closing $Sw_1$ and opening $Sw_2$ I make use of the circuit of Fig. 2. By opening $Sw_1$ and closing $Sw_2$ I make use of the circuit of Fig. 3. Preferably all the switches making up the bank $Sw_1$, are mechanically connected to open and close together; likewise those of $Sw_2$.

Having thus described my invention, what I claim is:

1. A metering circuit comprising a bridge portion and a rectifying portion said bridge portion having substantially equal resistances in two adjacent arms and similar pairs of similar diodes in the other two arms, all said diodes being connected in tandem, plate to cathode, a meter connected across said bridge to the common point of said resistances and to the common point of said pairs of diodes, a source of alternating current, said rectifying portion including one diode containing arm of said bridge and means cooperating with said last mentioned arm of said bridge for rectifying and reducing the amplitude of current from said source.

2. A metering circuit comprising a bridge portion and a rectifying portion, said bridge portion having substantially equal resistances in two adjacent arms, and similar pairs of similar diodes in the other two arms, all said diodes being connected in tandem, plate to cathode, a meter connected across said bridge to the common point of said resistances and to the common point of said pairs of diodes, said rectifying portion including one diode containing arm of said bridge, a source of alternating current, means including a resistor connecting one side of said source to said diode containing arm between the two diodes thereof, a pair of condensers of substantially equal capacity, means connecting one terminal of said condensers to the other side of said source, and means connecting the remaining terminals of said condensers across said diode containing arm.

3. A rectifying and metering circuit comprising a rectifying portion including two branches, each containing a rectifying valve and a condenser, the common points of said condensers and said valves being connected to the two sides of a source of alternating current and the junction of the valve and condenser in each branch being connected in circuit with a meter, and a shunt resistance connected in parallel with said meter and containing a rectifying valve, each of said valves having a non-linear current-resistance characteristic, said valves being arranged so that only dissimilar terminals are directly connected.

4. A rectifying and metering circuit comprising a rectifying portion including two branches, each containing a rectifying valve and a condenser, the common points of said condensers and said valves being connected to the two sides of a source of alternating current and the junction of the valve and condenser in each branch being connected in circuit with a meter, and a shunt resistance connected in parallel with said meter and containing a pair of rectifying valves, each of said valves having a non-linear current-resistance characteristic, said valves being arranged so that only dissimilar terminals are directly connected.

5. A circuit for measuring alternating current voltages comprising a direct current instrument, a pair of electronic valves connected together, plate to cathode, and connected in shunt with said instrument, additional electronic valve means connected in shunt with said instrument and so connected that the diode potential in one shunt opposes that in the other shunt whereby diode potential does not affect said instrument, and means including said pair of electronic valves, and a source of alternating current for applying across said instrument a rectified voltage.

6. A circuit for measuring alternating current voltages comprising a direct current instrument, a pair of electronic valves connected together, plate to cathode, and connected in shunt with said instrument, additional electronic valve means connected in shunt with said instrument and so connected that the diode potential in one shunt opposes that in the other shunt whereby diode potential does not affect said instrument, and means including said pair of electronic valves and a source of alternating current for applying across said instrument a rectified voltage approximating twice the peak voltage across said source of current.

7. A rectifying and metering circuit comprising a rectifying portion including rectifying electronic valve means, a source of current connected to supply an alternating voltage across said valve means, a meter connected in parallel with said valve means and separate electronic valve means connected in parallel with said meter, said valve means being arranged so that only dissimilar terminals are connected together.

8. A rectifying and metering circuit comprising a rectifying portion including a direct current meter connected across a source of alternating current, said circuit including electronic valve means connected in parallel with said meter, and separate electronic valve means also connected in parallel with said meter, said valves being so oriented in the circuits parallel to the meter that diode potentials in the two branches will oppose each other whereby to reduce flow of current through the meter resulting from diode potentials of said valves.

9. The circuit defined in claim 3 characterized by the addition thereto of conductor means and switch means for disconnecting from said circuit the said valves and the said meter and connecting the same in an auxiliary circuit wherein said valves are connected in a bridge circuit each half of which contains two valves connected plate to cathode, the valves of each half being connected in opposition, said meter being connected to the junction points of said valves of said bridge and said source of alternating current being connected to the mid points of said halves of said bridge.

JOB R. BARNHART.